United States Patent
Fukuyo et al.

(10) Patent No.: US 12,204,894 B2
(45) Date of Patent: *Jan. 21, 2025

(54) SOFTWARE UPDATE APPARATUS, SOFTWARE UPDATE METHOD, NON-TRANSITORY STORAGE MEDIUM STORING PROGRAM, VEHICLE, AND OTA MASTER

(71) Applicant: TOYOTA JIDOSHA KABUSHIKI KAISHA, Toyota (JP)

(72) Inventors: Satoru Fukuyo, Nisshin (JP); Tomoyasu Ishikawa, Nagoya (JP); Yusuke Satoh, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/142,290

(22) Filed: May 2, 2023

(65) Prior Publication Data
US 2023/0297368 A1 Sep. 21, 2023

Related U.S. Application Data

(63) Continuation of application No. 17/367,972, filed on Jul. 6, 2021, now Pat. No. 11,720,349.

(30) Foreign Application Priority Data

Jul. 8, 2020 (JP) .................. 2020-117848

(51) Int. Cl.
*G06F 8/71* (2018.01)
*G06F 8/41* (2018.01)
*G06F 8/65* (2018.01)

(52) U.S. Cl.
CPC .............. *G06F 8/71* (2013.01); *G06F 8/454* (2013.01); *G06F 8/65* (2013.01)

(58) Field of Classification Search
CPC .............. G06F 8/71; G06F 8/454; G06F 8/65
(Continued)

(56) References Cited

U.S. PATENT DOCUMENTS

2018/0341476 A1 11/2018 Kitao
2019/0138296 A1* 5/2019 Ishikawa ............... H04L 67/12
(Continued)

FOREIGN PATENT DOCUMENTS

| CN | 110244961 A | 9/2019 |
| JP | 2000-207681 A | 7/2000 |

(Continued)

OTHER PUBLICATIONS

Yuzo et al, "Vehicle Electronic Control System", an English translation of JP-2020027665-A, 2020, pp. 1-156, [Retrieved from PE2E database on Nov. 14, 2023], (Year: 2020).*

(Continued)

*Primary Examiner* — S. Sough
*Assistant Examiner* — Zengpu Wei
(74) *Attorney, Agent, or Firm* — Oliff PLC

(57) ABSTRACT

A software update apparatus includes a communication unit that sends a request for downloading update data to a center, a storage unit that stores the downloaded update data, and a control unit that executes, based on the update data, a control for installing, or installing and activating update software on one or more target electronic control units from among a plurality of electronic control units connected to each other via an in-vehicle network. The control unit acquires software versions of the electronic control units, determines whether there is a consistency in a combination of the acquired software versions, and executes, upon determining that there is an inconsistency in the combination of the acquired software versions, a process for attaining the consistency in the combination of the software versions.

8 Claims, 2 Drawing Sheets

(58) Field of Classification Search
USPC .......................................................... 717/170
See application file for complete search history.

(56) References Cited

U.S. PATENT DOCUMENTS

| | | | |
|---|---|---|---|
| 2019/0278582 A1 | 9/2019 | Miyake et al. | |
| 2019/0324858 A1 | 10/2019 | Sarkar et al. | |
| 2020/0110406 A1 | 4/2020 | Krishnamurthy et al. | |
| 2020/0174779 A1* | 6/2020 | David | G06F 8/654 |
| 2020/0249930 A1* | 8/2020 | Abe | G06F 9/4401 |
| 2021/0155252 A1 | 5/2021 | Harata et al. | |
| 2021/0389937 A1* | 12/2021 | Bordia | G06F 3/0614 |

FOREIGN PATENT DOCUMENTS

| | | | | |
|---|---|---|---|---|
| JP | 2009-053920 A | | 3/2009 | |
| JP | 2016-016835 A | | 2/2016 | |
| JP | 2019-159399 A | | 9/2019 | |
| JP | 2020-027630 A | | 2/2020 | |
| JP | 2020027665 A | * | 2/2020 | B60K 37/02 |
| JP | 6665728 B2 | | 3/2020 | |
| WO | 2019/182509 A1 | | 9/2019 | |

OTHER PUBLICATIONS

Onuma et al, "ECU Software Updating in Future Vehicle Networks", 2017, [Online], pp. 35-40, [Retrieved from internet on Sep. 5, 2024], <https://ieeexplore.ieee.org/stamp/stamp.jsp?arnumber=7929650> (Year: 2017).*

Aug. 26, 2022 Office Action Issued In U.S. Appl. No. 17/367,972.

Haider et al "Secure OTA Software Updates in Connected Vehicles: A Survey", 2019, [Online], pp. 1-18, [Retrieved from internet on Jan. 19, 2023], <https://arxiv.org/pdf/1904.00685.pdf> (Year: 2019.

Feb. 8, 2023 Notice Of Allowance issued in U.S. Appl. No. 17/367,972.

* cited by examiner

SOFTWARE UPDATE APPARATUS, SOFTWARE UPDATE METHOD, NON-TRANSITORY STORAGE MEDIUM STORING PROGRAM, VEHICLE, AND OTA MASTER

CROSS-REFERENCE TO RELATED APPLICATION

This application is a continuation of U.S. patent application Ser. No. 17/367,972, filed Jul. 6, 2021, which claims priority to Japanese Patent Application No. 2020-117848, filed on Jul. 8, 2020, the entire contents of each of which are incorporated herein by reference in their entirety.

BACKGROUND

1. Technical Field

The present disclosure relates to a software update apparatus, a software update method, a non-transitory storage medium storing the program, and an over-the-air (OTA) master, each of which updates a program of an in-vehicle device mounted on a vehicle, and the vehicle.

2. Description of Related Art

On a vehicle, a network system is mounted in which a plurality of in-vehicle devices, referred to as electronic control units (ECUs), is connected to each other via communication lines. Each in-vehicle device transmits and receives a message to and from the other in-vehicle devices in order to divide and execute each function of the vehicle.

An in-vehicle device typically includes a transitory storage unit, such as a processor and a RAM, or a non-volatile storage unit, such as a flash ROM. A program (software) executed by the processor is stored in the non-volatile storage unit. By rewriting the program as a newer version thereof and updating it, it is possible to enhance and improve functions of the in-vehicle devices.

Program updating includes a step of downloading for receiving update data from an external apparatus (a center) using wireless communication and the like, and a step of installing for writing an update program (update software) based on the downloaded update data in a storage unit of the in-vehicle device. In installation, there are an overwriting installation for overwriting a current program (a previous program) with the downloaded update program according to specifications of an in-vehicle device in one area (one side: a single bank) defined as an area for program storage from among storage areas of a storage unit and an other-side installation for writing the downloaded update program in an area (the other side) that is not an area (one side) in which a current program (a previous program) is stored from among two areas (two sides: a dual bank) defined as an area for the program storage.

In a case of the other-side installation, the step of program updating includes, in addition to respective steps of downloading and installing, a step of activating for configuring setting values, such as a start address of the update program such that the installed update program is set as an execution version.

In association with program updating of an ECU, Japanese Unexamined Patent Application Publication No. 2009-53920 (JP 2009-53920 A) discloses a system that updates a program of an ECU with a version-up program transmitted from a server. In the system of JP 2009-53920 A, when the program of the ECU is updated, whether a consistency between a program version after updating and a program version of another ECU is attained is confirmed, and an inconsistency in the versions due to the updating is prevented.

Japanese Unexamined Patent Application Publication No. 2016-16835 discloses a system in which each ECU includes a program backup area, a current program is stored as a previous program in the backup area before updating with a version-up program, and, in a case where a defect occurs in an ECU after updating with the version-up program, the previous program stored in the backup area is used, whereby a state is returned to a state where the ECU has operated normally.

SUMMARY

In order for the network system to function normally, it is necessary for a combination of program versions of a plurality of ECUs to be a combination in which their operations are guaranteed in advance (a combination in which a consistency is attained). Therefore, in a case where a program updating fails or in a case where a user desires to download a program, it is desirable not only to return the program of a specific ECU to a previous version, but also to execute transition to a state where the consistency in all program versions of a plurality of in-vehicle devices is attained and their operations are guaranteed.

The present disclosure provides, a software update apparatus, a software update method, a non-transitory storage medium storing a program, a vehicle, and an OTA master that can execute transition to a state where the consistency in all the program versions of a plurality of in-vehicle devices is attained and their operations are guaranteed in program updating of an in-vehicle device.

A software update apparatus according to a first aspect of the present disclosure includes a communication unit configured to send a request for downloading update data to a center, a storage unit configured to store the downloaded update data, and a control unit configured to execute, based on the update data, a control for installing, or installing and activating update software on one or more target electronic control units from among a plurality of electronic control units connected to each other via an in-vehicle network. The control unit is configured to acquire software versions of the electronic control units, determine whether there is a consistency in a combination of the acquired software versions, and execute, upon determining that there is an inconsistency in the combination of the acquired software versions, a process for attaining the consistency in the combination of the software versions.

In the first aspect, the control unit may restrict a predetermined operation of a vehicle, at least during the process for attaining the consistency.

In the first aspect, the control unit may start a restriction on the predetermined operation of the vehicle before executing the control for installing or activating, acquire the combination of the software versions of the electronic control units after the process for attaining the consistency, and release the restriction on the predetermined operation of the vehicle when the consistency in the acquired combination is attained.

In the first aspect, the control unit may specify an electronic control unit that causes the inconsistency from among the electronic control units as the process for attaining the consistency, and update software of the electronic control unit that causes the inconsistency based on data used for updating software of the electronic control unit that causes the inconsistency from among the update data.

In the first aspect, the control unit may specify the electronic control unit that causes the inconsistency based on the combination of the software versions.

In the first aspect, the control unit may specify an electronic control unit that causes the inconsistency from among the electronic control units as the process for attaining the consistency and control the electronic control unit that causes the inconsistency such that the electronic control unit sets software before updating as an execution version.

In the first aspect, the control unit may control, in a case where the electronic control unit that causes the inconsistency stores the software before the updating, the electronic control unit that causes the inconsistency such that the electronic control unit sets the stored software before the updating as the execution version.

In the first aspect, the control unit may control, in a case where there is the consistency in the combination of the software versions when a software version of the electronic control unit that causes the inconsistency is set as a version before the updating, the electronic control unit that causes the inconsistency such that the electronic control unit sets the software before the updating as the execution version.

In the first aspect, the control unit may acquire, when an electronic control unit that stores the software before the updating receives a designation for setting the software before the updating as an execution version, the software versions of the electronic control units, and control, in a case where, in the combination of the acquired versions, there is the consistency in the combination of versions even when the software version of the designated electronic control unit is set as the software version before the updating, the electronic control unit such that the electronic control unit sets the software before the updating as the execution version.

In the first aspect, a function of the control unit may be implemented in software of two or more electronic control units, respectively or in software, which is separate from software to be updated, of one electronic control unit from among the electronic control units.

A second aspect of the present disclosure is a software update method executed by a computer of a software update apparatus. The software update method includes a step of sending a request for downloading update data to a center, a step of storing the downloaded update data, a step of executing, based on the update data, a control for installing, or installing and activating update software on one or more target electronic control units from among a plurality of electronic control units connected to each other via an in-vehicle network, and a step of acquiring software versions of the electronic control units, determining whether there is a consistency in a combination of the acquired software versions, and executing, upon determining that there is an inconsistency in the combination of the acquired software versions, a process for attaining the consistency in the combination of the software versions.

A third aspect of the present disclosure is a non-transitory storage medium storing a program which is executable on a computer of a software update apparatus and causes the computer to execute functions. The functions include sending a request for downloading update data to a center, storing the downloaded update data, executing, based on the update data, a control for installing, or installing and activating update software on one or more target electronic control units from among a plurality of electronic control units connected to each other via an in-vehicle network, and acquiring software versions of the electronic control units, determining whether there is a consistency in a combination of the acquired software versions, and executing, upon determining that there is an inconsistency in the combination of the acquired software versions, a process for attaining the consistency in the combination of the software versions.

A fourth aspect of the present disclosure is a vehicle including the software update apparatus.

An OTA master according to a fifth aspect of the present disclosure includes a communication unit configured to send a request for downloading update data to a center, a storage unit configured to store the downloaded update data, and a control unit configured to execute, based on the update data, a control for installing, or installing and activating update software on one or more target electronic control units from among a plurality of electronic control units connected to each other via an in-vehicle network. The control unit is configured to acquire software versions of the electronic control units, determine whether there is a consistency in a combination of the acquired software versions, and execute, upon determining that there is an inconsistency in the combination of the acquired software versions, a process for attaining the consistency in the combination of the software versions.

A sixth aspect of the present disclosure is a software update method executed by a computer of an OTA master. The software update method includes a step of sending a request for downloading update data to a center, a step of storing the downloaded update data, a step of executing, based on the update data, a control for installing, or installing and activating update software on one or more target electronic control units from among a plurality of electronic control units connected to each other via an in-vehicle network, and a step of acquiring software versions of the electronic control units, determining whether there is a consistency in a combination of the acquired software versions, and executing, upon determining that there is an inconsistency in the combination of the acquired software versions, a process for attaining the consistency in the combination of the software versions.

A seventh aspect of the present disclosure is a non-transitory storage medium storing a program which is executable on a computer of an OTA master and causes the computer to execute functions. The functions include sending a request for downloading update data to a center, storing the downloaded update data, executing, based on the update data, a control for installing, or installing and activating update software on one or more target electronic control units from among a plurality of electronic control units connected to each other via an in-vehicle network, and acquiring software versions of the electronic control units, determining whether there is a consistency in a combination of the acquired software versions, and executing, upon determining that there is an inconsistency in the combination of the acquired software versions, a process for attaining the consistency in the combination of the software versions.

With each aspect of the present disclosure, in program updating of an in-vehicle device, since a consistency in a combination of program versions of a plurality of in-vehicle devices is confirmed, it is possible to execute transition to a state where a consistency in all program versions of the plurality of in-vehicle devices is attained and an operation of a network system is guaranteed.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Embodiments

Configuration

Figure 1:
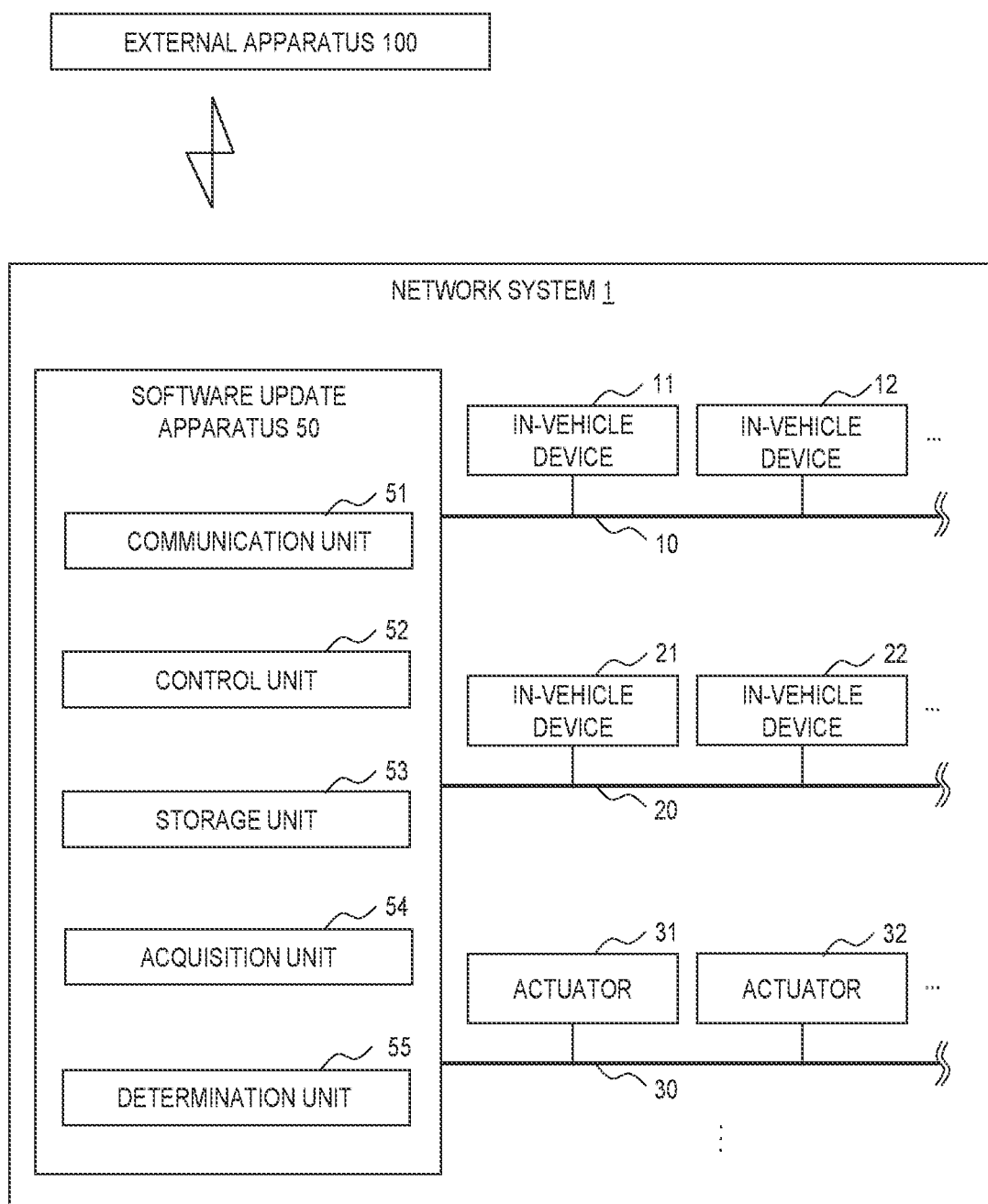
FIG. 1 is a configuration diagram of a network system according to one embodiment.

FIG. 1 illustrates a configuration diagram of a network system 1 according to one embodiment. The network system 1 is mounted on a vehicle. The network system 1 includes a software update apparatus 50. A plurality of buses 10, 20, 30, . . . is connected to the software update apparatus (an OTA master) 50. A plurality of in-vehicle devices (electronic control units) 11, 12, . . . is connected to the bus 10. A plurality of in-vehicle devices 21, 22, . . . is connected to the bus 20. A plurality of actuators 31, 32, . . . is connected to the bus 30. In FIG. 1 and the following descriptions, the buses 10, 20, 30 are exemplified as buses, the in-vehicle devices 11, 12, 21, 22 are exemplified as in-vehicle devices, and actuators 31, 32 are exemplified as actuators, but the number of buses, in-vehicle devices, or actuators is not limited.

The software update apparatus 50 includes a communication unit (a communication module) 51, which can communicate with an external apparatus 100 (a center) provided outside the vehicle, and a control unit 52 that controls updating of programs of the respective in-vehicle devices 11, 12, 21, 22 based on update data provided from the external apparatus 100. The software update apparatus 50 is typically a computer that includes a non-volatile storage unit (a storage) 53, such as a flash ROM, a processor that executes various processes by reading a program from the non-volatile storage unit and executing it, and a transitory storage unit, such as a RAM, that stores a part of a program or data. The software update apparatus 50 also controls or relays communication between the external apparatus 100 and the respective in-vehicle devices 11, 12, 21, 22, communication between the in-vehicle devices 11, 12, 21, 22, communication between the respective in-vehicle devices 11, 12, 21, 22 and the respective actuators 31, 32 via the respective buses 10, 20, 30. In this manner, the software update apparatus 50 also functions as a relay apparatus that relays communication.

The respective in-vehicle devices 11, 12, 21, 22 communicate with each other to execute various processes for controlling the vehicle. Similar to the software update apparatus 50, these in-vehicle devices 11, 12, 21, 22 are typically computers that include storage units (storages) and processors, respectively.

The actuators 31, 32 are devices that cause a vehicle or its parts, such as a brake, an engine, or a power steering device, to generate a mechanical action and operate based on instructions from the in-vehicle devices 11, 12, 21, 22.

The control unit 52 of the software update apparatus 50 can update the programs stored in the respective storage units of the in-vehicle devices 11, 12, 21, 22. In other words, the software update apparatus 50 executes controls for downloading, installation, or further, activation. The downloading is a process for receiving and storing update data (a distribution package) for updating any of the programs of the in-vehicle devices 11, 12, 21, 22, which is transmitted from the external apparatus 100. A control for downloading can include not only execution of the downloading but also controls of a series of processes associated with the downloading, such as a determination on whether the execution of the downloading is possible and verification of the update data. Installation is a process for writing a program (update software) of an updated version on a storage unit of an in-vehicle device to be updated, based on downloaded update data. A control for installation can include not only execution of the installation but also controls of a series of processes associated with the installation, such as a determination on whether the execution of the installation is possible, sending the update data, and verification of the updated version of the program. Activation is a process for making the updated version of the installed program effective (activate). A control for activation can include not only execution of the activation but also controls of a series of processes associated with the activation, such as a determination on whether the execution of the activation is possible and verification of a result of the execution.

In the control for installation, when the update data includes an update program itself, the control unit 52 can transmit the update program to the in-vehicle devices 11, 12, 21, 22. Alternatively, when the update data includes compressed data, difference data, or divided data of the update program, the control unit 52 may generate the update program by, for example, developing or assembling the update data and transmit it to the in-vehicle devices 11, 12, 21, 22. Alternatively, the control unit 52 may transmit the update data to the in-vehicle devices 11, 12, 21, 22, and the in-vehicle devices 11, 12, 21, 22 may generate the update program by, for example, developing or assembling the update data.

The installation itself for writing the update program on a second storage unit of the in-vehicle device may be executed by the control unit 52, by the in-vehicle device that has received an instruction from the control unit 52, or autonomously by the in-vehicle device that has received the update data (or the update program) without the explicit instruction from the control unit 52.

The activation itself for making the installed update program effective may be executed by the control unit 52, by the in-vehicle device that has received an instruction from the control unit 52, or autonomously by the in-vehicle device without the explicit instruction from the control unit 52, following the installation.

Such a program updating process can be executed continuously or in parallel for each of the plurality of in-vehicle devices 11, 12, 21, 22.

Processing

Figure 2:
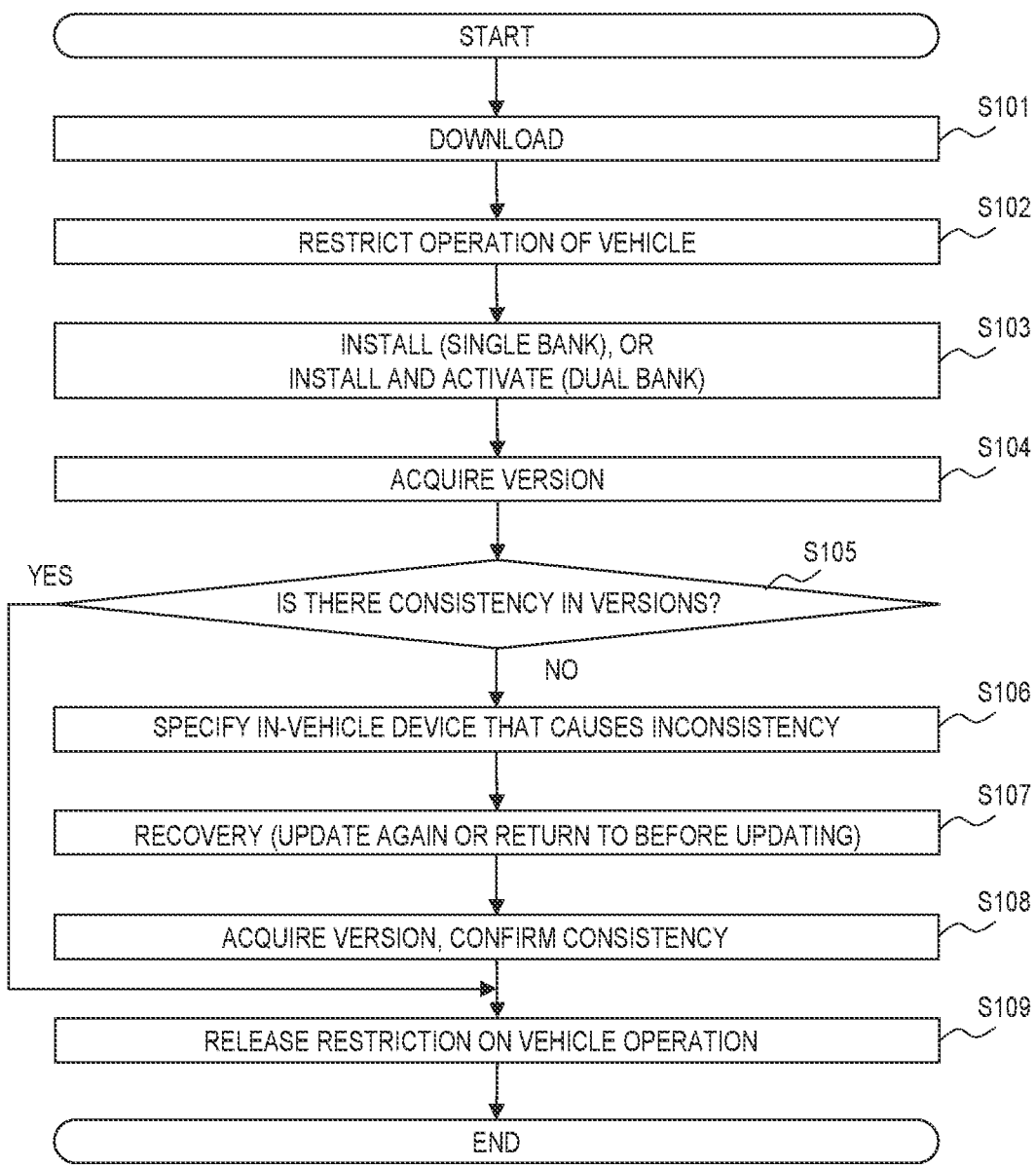
FIG. 2 is a flowchart illustrating processing according to the embodiment.

Hereinbelow, an example of a process according to the present embodiment will be described. FIG. 2 is a flowchart illustrating an example of a software updating process executed by the software update apparatus 50. This process is started when, for example, the software update apparatus 50 requests the update data from the external apparatus 100.

(Step S101) The communication unit 51 receives, from the external apparatus 100, the update data for updating one or more programs of the in-vehicle devices included in the vehicle. The control unit 52 stores the update data in the storage unit of the software update apparatus 50 (downloading).

In response to an inquiry from the software update apparatus 50, the external apparatus 100 determines whether the updated versions of the programs of in-vehicle devices exist among the programs provided to the external apparatus 100 based on types or current program versions of the in-vehicle devices that the external apparatus 100 has stored in advance or that is acquired from the software update apparatus 50. Here, the in-vehicle devices refers to in-vehicle devices included in the network system 1. When the updated program version is provided, the external apparatus 100 generates the update data based on the updated version of the provided program and provides the generated update data to the software update apparatus 50. Upon successfully updating all the programs based on the update data, the external apparatus 100 generates the update data such that the consistency in the program versions of all the in-vehicle devices included in the network system 1 is attained.

(Step S102) The control unit 52 restricts an operation of the vehicle. For example, when the in-vehicle device executes the above-described overwriting installation or activation, the operation of the in-vehicle device may be influenced and the control of the vehicle by the network system 1 may also be influenced. For this reason, in this step, the control unit 52 may stop or prohibit a predetermined operation of the vehicle, which is defined as an operation that should not be influenced, such as engine driving, so as to prevent an unexpected behavior. The control unit 52 may postpone such a restriction on the predetermined operation and processes after this step until the user permits it. When the type of all the in-vehicle devices of which the programs are to be updated is the above-described dual bank type, the control unit 52 may restrict the predetermined operation after the execution of the above-described other-side installation and before the execution of the activation.

(Step S103) The control unit 52 controls the communication unit 51 such that the in-vehicle device of which the program is to be updated executes, based on the update data, the installation, activation, or the like. In other words, when the type of the in-vehicle device is the above-described single bank type, the control unit 52 causes the in-vehicle device to execute the overwriting installation. On the other hand, when the type of the in-vehicle device is the dual bank type, the control unit 52 causes the in-vehicle device to execute the other-side installation and activation in order.

(Step S104) The control unit 52 acquires information indicating a current program version from each in-vehicle device via the communication unit 51.

(Step S105) The control unit 52 determines whether there is a consistency in a combination of the acquired versions. For example, when the acquired versions include all the versions of the update versions of the programs that are included in the update data, the control unit 52 can determine that there is the consistency in the acquired versions. Otherwise, the control unit 52 can determine that an abnormality has occurred in any of the in-vehicle devices for some reason in the program updating process or thereafter. When the program has been successfully updated, the process proceeds to step S109. Otherwise, the process proceeds to step S106.

(Step S106) For example, the control unit 52 compares the combination of the acquired versions with the versions of the updated versions of the programs included in the update data, and specifies an in-vehicle device that causes an inconsistency in the versions.

(Step S107) The control unit 52 repeats the same process as in step S103 to each in-vehicle device that causes the inconsistency, and re-executes the updating. Alternatively, when the in-vehicle device that causes the inconsistency is the in-vehicle device that executes the other-side installation (the dual bank) and stores the program before the updating (the program that has been executed until now), the control unit 52 may cause the in-vehicle device to execute a process for configuring the setting (a recovery process) such that the in-vehicle device continuously executes the program before the updating. Even the program before the updating is often consistent with the program versions of other in-vehicle devices. When executing such a recovery process, the control unit 52 may acquire program versions of a plurality of in-vehicle devices, and in a combination of the acquired versions, may cause the in-vehicle device that is to execute the recovery process to execute the recovery process after confirming that there is the consistency in the combination of the versions even when the program version of the in-vehicle device is set as the version of the program before the updating.

(Step S108) In the same manner as in step S104, the control unit 52 acquires the information indicating the current program version from each in-vehicle device and confirms that there is the consistency in the combination of the current program versions. The consistency is confirmed when, for example, the acquired versions include all the versions of the updated versions of the programs that are included in the update data, and the control unit 52 can determine that the program has been successfully updated. Alternatively, when some of the in-vehicle devices have executed the recovery process, the control unit 52 may transmit, to the external apparatus 100, the combination of the current program versions and inquire whether there is the consistency therein. The external apparatus 100 can determine whether there is the consistency in the combination of the program versions by referring to a table, given in advance, of a plurality of combinations of the versions, of which the consistency has been attained. Alternatively, the control unit 52 may acquire and store such a table from the external apparatus 100 together with the update data in advance, and confirm the consistency in the combination of the current program versions by referring to the table.

In this step, when the control unit 52 cannot confirm that there is the consistency in the combination of the current program versions, the control unit 52 may repeat steps S107 and S108 until there is the consistency. For example, when the control unit 52 cannot confirm the consistency even after re-executing the updating a plurality of number of times, the control unit 52 may cause the in-vehicle devices to execute the recovery process. Further, when the control unit 52 cannot confirm the consistency even after repeating steps S107 and S108 a predetermined number of times, there is a probability that a non-temporary abnormality has occurred in the software update apparatus 50 or the in-vehicle device, or, as a result of the recovery process, there is the inconsistency between the version and the program version after the updating of the other in-vehicle devices. Thus, the control unit 52 takes a measure, such as notifying the user of the occurrence of an abnormality. When such an abnormality occurs, in a case where all the in-vehicle devices store the programs before the updating, the control unit 52 may cause all the in-vehicle devices to execute the recovery process.

(Step S109) The control unit 52 releases the restriction on the operation of the vehicle, executed in step S102. Then, the process ends. In the installation, when the update data includes the update program itself, the control unit 52 transmits the update program to the in-vehicle device. Further, when the update data includes the compressed data, the difference data, or the divided data of the update program, the control unit 52 may generate the update program by, for example, developing or assembling the update data and transmit it to the in-vehicle device. Alternatively, the control unit 52 may transmit the update data to the in-vehicle device, and the in-vehicle device may generate the update program by, for example, developing or assembling the update data. The external apparatus 100 or the software update apparatus 50 may explicitly instruct the in-vehicle device to execute the installation or the activation, the in-vehicle device may execute these processes based on the instruction, or the in-vehicle device that has received the update data (or the update program) may autonomously execute these processes without the explicit instruction.

As described above, in the present embodiment, since the operation of the vehicle is restricted without completing the updating process until confirming the consistency in the combination of the program versions of the respective in-vehicle devices, in a case where the program updating fails, it is possible to attain the consistency in the versions while preventing an unexpected behavior of the vehicle.

Further, since the updating is re-executed even when the program updating fails once, a probability of finally updating the program successfully can be increased.

Further, since the program before the updating can be used with a premise that the consistency in the combination of the program versions of the respective in-vehicle devices can be confirmed even when the program updating fails, the operation of the network system 1 can be guaranteed.

After the program is successfully updated, a user may desire to return a program of a specific in-vehicle device to a program before the updating. In such a case, the control unit 52 may receive a designation on the in-vehicle device from the user and return the program of the in-vehicle device to the program before the updating. When the in-vehicle device stores the program before the updating, such a process can be executed by configuring the setting such that the in-vehicle device sets the program before the updating as the execution version. In this case, the control unit 52 acquires the program versions of the plurality of in-vehicle devices, and when the control unit 52 can confirm that there is the consistency in the combination of the acquired versions even if the control unit 52 returns the program version of the designated in-vehicle device to the program before the updating, the control unit 52 configures the setting. As such, according to the desire of the user, it is possible to download the program with a premise that the consistency in the combination of the program versions of the respective in-vehicle devices can be confirmed. During the execution of this process, the control unit 52 may also restrict a predetermined operation of the vehicle, and release the restriction after confirming the consistency in the versions similar to step S108.

As described above, when there is the inconsistency in the combination of the program versions acquired after executing the program installation (in the case of the single bank), or the installation and the activation (in the case of the dual bank), the control unit 52 determines that the program version cannot be notified to the control unit 52 as a result of an occurrence of some abnormality, such as an error in the process for updating the program of any of the in-vehicle devices or a defect in the program provided as the updated version of the program in any of the in-vehicle devices even when there is no error in the process for installing or activating the program of any of the in-vehicle devices. The control unit 52 specifies the in-vehicle device as an in-vehicle device that causes the inconsistency in the versions. As such, in the present embodiment, even in a case where the inconsistency in the versions occurs as a result of an occurrence of some abnormality in the in-vehicle device not only in the process for updating the program but also in the processes thereafter when, for example, the type of the in-vehicle device is a dual bank type and stores the program before the updating, it is possible to execute a return to the state before the updating where no abnormality occurs and where the consistency in the combination of the program versions is attained. As such, even when some abnormality occurs after the program updating, it is possible to certainly and quickly execute a return to a normal state where the operation is guaranteed without spending time and incurring costs on determining whether there is a defect in the program. Further, in each in-vehicle device, when some abnormality occurs, caused by or accompanied by the program updating, such as an error in program installation or activation, or a defect in the program, the control unit 52 may determine whether the in-vehicle device causes the inconsistency in the versions using one or more other methods, such as a result of self-diagnosis of the in-vehicle device and monitoring of the operation of the in-vehicle device by the control unit 52 in addition to the program version. The determination method is not limited thereto.

Although one example of the embodiment has been described above, the functions of the control unit 52 may be provided in one of the in-vehicle devices. For example, the functions may be implemented in respective programs of two or more in-vehicle devices, or in a program, which is separate from the program to be updated, of one in-vehicle device, from among a plurality of in-vehicle devices. In this manner, it is not necessary to provide a dedicated configuration for the functions of the control unit 52. Further, when the functions of the control unit 52 are implemented in respective programs of two or more in-vehicle devices and the program of one of the in-vehicle devices is updated from among the plurality of in-vehicle devices, the other in-vehicle device can execute the functions of the control unit 52. Alternatively, when the functions are implemented in a program, which is separate from the program to be updated, of one in-vehicle device and the program of the in-vehicle device is updated, the in-vehicle device can execute the functions of the control unit 52 without being hindered by the processing.

Advantageous Effect

As above, according to the embodiment of the present disclosure, a software update apparatus confirms a consistency in a combination of program versions of a plurality of in-vehicle devices. Thus, by a program updating process, it is possible to execute transition to a state where the consistency in the versions of all the programs of the plurality of in-vehicle devices is attained and their operations are guaranteed.

The disclosed technology can be regarded as not only a software update apparatus, but also a network system including the software update apparatus, a method executed by a computer included in the software update apparatus, a program and a non-transitory computer-readable storage medium storing the program, and a vehicle including the software update apparatus.

The present disclosure is useful for a software update apparatus that updates a program of an in-vehicle device mounted on a vehicle.

What is claimed is:
1. A software update apparatus comprising:
a computer comprising a storage, and a processor that is programmed to:
generate a request for downloading update data from a center;
receive and store the downloaded update data in the storage;

execute, based on the update data, a control for installing, or installing and activating, updated software on at least one target electronic control unit from among a plurality of electronic control units connected to each other via an in-vehicle network;

acquire, in response to execution of a first control for installing, or a second control for installing and activating updated software, software versions of the electronic control units;

receive a user request to return the updated software to a version installed before the control, and in response to the user request, confirm that there is consistency in a combination of software versions before the first control or second control is executed in some electronic control units of the plurality of electronic control units that have executed the first control or second control, and software versions of the plurality of electronic control units other than the some of the electronic control units; and return the software versions of the some of the electronic control units to the software versions before the updating if the consistency is present.

2. The software update apparatus according to claim 1, wherein the software update apparatus is mounted in a vehicle.

3. The software update apparatus according to claim 1, wherein the processor is configured to verify the update data or the installed updated software.

4. The software update apparatus according to claim 1, wherein the processor is configured to execute the control for installing, or installing and activating updated software, on a plurality of target electronic control units, including the at least one target electronic control unit.

5. The software update apparatus according to claim 4, wherein the processor is configured to execute the control for installing, or installing and activating updated software, on the plurality of target electronic control units continuously or in parallel for each of the plurality of target electronic control units.

6. The software update apparatus according to claim 1, wherein the processor is further programmed to return the software versions of the some of the electronic control units to the software versions before the updating, in response to detecting an abnormality in one of the some of the electronic control units.

7. A method of updating software comprising:
controlling a computer that includes a storage and a processor so as to:
generate a request for downloading update data from a center;
receive and store the downloaded update data in the storage;
execute, based on the update data, a control for installing, or installing and activating, updated software on at least one target electronic control unit from among a plurality of electronic control units connected to each other via an in-vehicle network;
acquire, in response to execution of a first control for installing, or a second control for installing and activating updated software, software versions of the electronic control units;
receive a user request to return the updated software to a version installed before the control, and in response to the user request, confirm that there is consistency in a combination of software versions before the first control or second control is executed in some electronic control units of the plurality of electronic control units that have executed the first control or second control, and software versions of the plurality of electronic control units other than the some of the electronic control units; and
return the software versions of the some of the electronic control units to the software versions before the updating in response to the consistency being present.

8. A non-transitory computer readable medium storing an executable program that causes a computer that includes a storage and a processor to execute steps comprising:
generate a request for downloading update data from a center;
receive and store the downloaded update data in a storage;
execute, based on the update data, a control for installing, or installing and activating, updated software on at least one target electronic control unit from among a plurality of electronic control units connected to each other via an in-vehicle network;
acquire, in response to execution of a first control for installing, or a second control for installing and activating updated software, software versions of the electronic control units;
receive a user request to return the updated software to a version installed before the control, and in response to the user request, confirm that there is consistency in a combination of software versions before the first control or second control is executed in some electronic control units of the plurality of electronic control units that have executed the first control or second control, and software versions of the plurality of electronic control units other than the some of the electronic control units; and
return the software versions of the some of the electronic control units to the software versions before the updating in response to the consistency being present.

* * * * *